United States Patent Office 3,772,233
Patented Nov. 13, 1973

3,772,233
WAX COMPOSITIONS INCORPORATING
ALPHA OLEFINS
Frederick Gaab, Bethpage, N.Y., and John W. Padgett and Sherman T. Van Esselstyn, New Canaan, Conn., assignors to Moore & Munger, Inc., Stamford, Conn.
No Drawing. Continuation-in-part of abandoned application Ser. No. 85,218, Oct. 29, 1970. This application July 24, 1972, Ser. No. 274,622
Int. Cl. C08f 45/52; C09d 13/00
U.S. Cl. 260—28.5 A 3 Claims

ABSTRACT OF THE DISCLOSURE

Petroleum waxes mixed with alpha olefins to produce base wax compositions superior to conventional petroleum wax compositions, and possessing unique dispersing properties, such that stearic acid may be eliminated or used in substantially reduced quantities. Any desired additives may be utilized to produce a product having physical properties required for crayon wax compositions, candle wax compositions, color concentrates, carbon paper, shoe polish, and similar products.

RELATED APPLICATIONS

This application is a continuation-in-part application of our co-pending United States patent application bearing Ser. No. 85,218 and filed on Oct. 29, 1970, now abandoned.

BACKGROUND OF THE INVENTION

This invention relates to wax compositions, and more particularly to base wax compositions to be mixed with pigments or other additives required to provide the desired qualities and characteristics in the final product.

Wax products are commonly used for various objects and writing or copying products such as candles, crayons, and carbon papers. Wax products are also used in color concentrates for addition to molded or extruded plastic articles. In many instances these products employ the wax compositions to form the structural shape as well as to serve the functional purpose of the product. Currently, these products are manufactured from a base wax composition consisting essentially of petroleum or synthetic waxes. Various additives are also incorporated in each particular product to obtain the specific properties desired, such as stearic acid and pigment or dyes for candle and crayon colors. The final product should be sufficiently strong and should possess suitable molding characteristics.

The wax crayon is unique and requires many additives since the end product must be uniform and solid throughout, while also being tough, rigid and strong to form an acceptable supporting structure which is still soft enough to carry and deposit the desired pigment as a legible mark when rubbed under pressure against the surface to be marked. Furthermore, the crayon must resist flaking or "balling" of the wax during use.

Typical base wax formulations consist of a paraffinic petroleum wax having a melting point, by ASTM Standard D-87, between 140° F. and 150° F., and these formulations normally incorporate about 10 to 30% stearic acid. Stearic acid is utilized in base wax compositions as a carrier for the pigment to achieve uniformity of color and, in crayon and carbon paper manufacturing, to provide satisfactory writing and copying qualities. Although stearic acid is widely used and successfully performs its functions, it is expensive and substantially increases the cost of the final product.

Therefore, it is an object of this invention to provide base wax compositions in which the requirement for stearic acid is substantially reduced or eliminated.

Another object of this invention is to provide base wax compositions of the above character having uniform dispersion of the pigment, and excellent mold release qualities.

Another object of this invention is to provide base wax compositions of the above character for use in manufacturing crayons and carbon paper having satisfactory writing or marking qualities.

A further object of this invention is to provide base wax compositions of the above character for the manufacture of crayons having improved resistance to flaking or "balling" during the physical marking or writing operation.

Another object of this invention is to provide base wax compositions of the above character for use in manufacturing crayons having excellent rigidity and toughness combined with normal bending and tensile strength characteristics.

Another object of this invention is to provide base wax compositions of the above character for the manufacture of candles having excellent mold release properties, burning qualities, hardness and opacity.

A still further object of this invention is to provide base wax compositions of the above character for use in color concentrates having superior pigment-dispersion characteristics.

Other objects of the invention will in part be obvious and will in part appear hereinafter.

SUMMARY OF THE INVENTION

The base wax compositions according to this invention substantially reduce or eliminate the need for stearic acid by employing alpha olefins having a minimum congealing point of 120° F., by ASTM Standard D-938. The alpha olefins are combined with petroleum waxes having a minimum congealing point, by ASTM Standard D-938, of 125° F. These petroleum waxes may comprise any combination of paraffinic, intermediate, or microcrystalline waxes, as is well known in the trade, to obtain the specific properties desired. In addition, pigments, dyes, minor amounts of synthetic waxes, vegetable and mineral waxes, polymeric materials, and reduced amounts of stearic acid may be utilized to obtain specifically desired properties in the final product.

DESCRIPTION OF THE PREFERRED EMBODIMENT

The base wax composition according to this invention comprises preferably at least 10% by weight of alpha olefins having a minimum congealing point of 120° F. (ASTM D-938), with the balance of the composition preferably comprising petroleum wax or waxes having a minimum congealing point of 125° F. (ASTM D-938). Furthermore, the alpha olefins of this invention have a minimum iodine value of 30, an average molecular weight of from 350 to 900, and a maximum Brookfield Viscosity at 125° C. (257° F.) of 100 centipoises.

Commercial paraffin wax is generally a major constituent of the invention, and ordinarily consists of essentially straight chain or normal paraffin hydrocarbons of the $C_nH_{2n+2}$ series. These paraffin waxes are generally characterized by a melting point between 120° F. and 170° F. They are produced from the heavier fractions of petroleum distillates by first dewaxing the distillates to obtain a slack wax or a semi-refined product, and then deoiling the slack wax to obtain the fully refined paraffin wax.

The preferred paraffin wax component that has been found is known, to one skilled in the art, as a 133/35 Melting Point Fully Refined Paraffin Wax. This paraffin wax has a congealing point between 133° F. and 135° F. (ASTM D-938). The wax is produced in the normal manner and typically possesses the physical properties listed in Table I.

TABLE I.—133/35 FULLY REFINED PARAFFIN WAX

| | |
|---|---|
| Melting point (° F.) (ASTM D-87) | 133/35 |
| Consistometer hardness at 100° F. (Abraham Units) (Moore & Munger), minimum | 12 |
| Tensile strength (lbs./sq. in.) (ASTM D-1320), minimum | 360 |
| Oil content (percent) (ASTM D-721), maximum | 0.5 |
| Color, Saybolt (ASTM D-156) | +30 |
| Heat stability 250° F. in glass (hours) (Moore & Munger), minimum | 16 |
| Odor (0–4 scale) (ASTM D-1833), maximum | 2.5 |

As one skilled in the art would realize, various petroleum waxes may be blended in order to optimize specific desired properties. The petroleum waxes most commonly blended with the paraffin wax are intermediate waxes which contain more branches than the normal paraffin wax, and microcrystalline wax. Generally, microcrystalline wax is added to the composition in amounts up to about 25% by weight. Most microcrystalline wax used has a minimum congealing point of 125° F. (ASTM D-938). The preferred microcrystalline wax for blending with the paraffin wax is known, to one skilled in the art, as 165/75 Fully Refined Microcrystalline Wax. Typical physical properties for this preferred wax are listed in Table II.

TABLE II.—165/75 FULLY REFINED MICROCRYSTALLINE WAX

| | |
|---|---|
| Melting point (° F.) (ASTM D-127) | 175 |
| Oil content (percent) (ASTM D-721) | 4.0 |
| Needle penetration at 77° F. (mm./10) (ASTM D-1321) | 27 |
| Color, Saybolt (ASTM D-156) | 2 |
| Viscosity, Saybolt, 210° F. (SUS) (ASTM D-88) | 80 |
| Congealing point (ASTM D-938) | 167 |

Presently existing base wax compositions for the manufacture of crayons, candles and similar products generally require the addition of stearic acid to conventional petroleum wax compositions. The base wax compositions of this invention reduce or eliminate the need for expensive stearic acid by mixing alpha olefins into the paraffin wax or the blend of petroleum waxes to form the base wax composition. The alpha olefins should comprise, preferably, at least 10% by weight of the base wax composition, should have a minimum congealing point of 120° F. (ASTM D-938), and should have a molecular weight between 350 and 900.

The preferred alpha olefins have a congealing point between 150° F. and 165° F. (ASTM D-938) and a molecular weight of about 600. The olefins are produced by polymerizing ethylene, a petroleum-derived hydro-carbon, using a modified process such that one double-bond functional group per molecule is retained in the final products. The products are wax-like solids resembling the paraffin waxes derived from petroleum. They are soft and/or friable such that they can be readily flaked or powdered with the fingernail. Chemically they differ from petroleum waxes and conventional polyethylenes in that they contain a relatively high degree of unsaturation (iodine value=30 miinmum) whereas in petroleum waxes and conventional polyethylenes the degree of unsaturation is essentialy zero (iodine value=nil). This high degree of unsaturation imparts polarity to the molecules, and produces unique pigment dispersing properties in the alpha olefins. They have a minimum congealing point of 120° F. and average molecular weights from about 350 to about 900. In the molten state they are characterized by extremely low viscosities (Brookfield viscosity at 257° F.=100 cps. maximum) and may readily be handled like water. When blended with petroleum, vegetable and synthetic waxes, the resultant blends are low in viscosity and retain the high fluidity.

The conventional polyethylenes cited against the parent patent application are produced by polymerizing ethylene such that the final product is essentially saturated and paraffinic in nature. The products are hard, plastic-like substances which cannot be readily flaked with the fingernail. Chemically they differ from the alpha olefins of the invention in that they contain essentially zero unsaturation (iodine value=nil). Hence, they do not possess pigment dispersing properties as do the alpha olefins. They have Ring and Ball Softening Points in excess of 200° F. and because of their high solidification points and high viscosities, the ASTM Congealing Point test is not applicable. If applicable, the values obtained would be far in excess of 200° F. The conventional polyethylenes have a minimum average molecular weight of 1000. In the molten state they are characterized by high viscosities and when blended with petroleum, vegetable and synthetic waxes impart high viscosity and decreased fluidity to the blends.

Since these olefins are produced from ethylene, they contain no odd numbered carbon chains. As one skilled in the art would understand, the polymerization of ethylene does not produce a uniform homogeneous product, but instead produces a heterogeneous product incorporating various isomers. The typical alpha olefin product would consist of hydrocarbons in varying amounts which can be structurally represented by $RCH=CH_2$, $$R_2C=CH_2$$

$RCH=CHR$, and $R_2C=CHR$, where the total carbon atoms in each molecule can vary from twenty-two to fifty-six.

The alpha olefin product preferably comprises at least 50% normal alpha olefin ($RCH=CH_2$). The preferred alpha olefin comprising at least 10% of the base wax compositions of this invention typically exhibit the physical properties listed in Table III, and the distinct variations between this preferred alpha olefin and conventional polyethylene are shown in Table IV.

TABLE III.—PREFERRED ALPHA OLEFIN

| | |
|---|---|
| Average molecular weight | 600 |
| Congealing point (° F.) | 158 |
| Needle penetration (tenths of mm.): | |
| 77° F. | 14 |
| 100° F. | 37 |
| 110° F. | 54 |
| Viscosity, Saybolt, 210° F. (SUS) | 52 |
| Viscosity, Brookfield, 257° F. (cps.) | 4 |
| Iodine value | 70 |
| Color, Saybolt | +2 |

TABLE IV.—ALPHA OLEFINS AND CONVENTIONAL POLYETHYLENES

| | Preferred alpha olefin | Conventional polyethylenes | | | | | | |
|---|---|---|---|---|---|---|---|---|
| | | No. 1 | No. 2 | No. 3 | No. 4 | No. 5 | No. 6 | No. 7 |
| Average molecular weight | 600 | 1,800 | 2,300 | 3,000 | 7,000 | 8,000 | 12,000 | 23,000 |
| Congealing point (° F.) | 158 | | | | | | | |
| Ring and ball softening point (° F.) | | 223 | 235 | 232 | 216 | 219 | 230 | 235 |
| Needle penetration, 77° F. | 14 | 3 | 1 | 2 | 3 | 4 | | |
| Iodine value | 70 | Nil | Nil | Nil | Nil | Nil | Nil | Nil |
| Brookfield viscosity (cps.): | | | | | | | | |
| 125° C. (257° F.) | 4 | 230 | 430 | 1,800 | | | | |
| 150° C. (320° F.) | 3 | | | | 4,300 | 9,400 | | |
| 190° C. (374° F.) | | | | | | | 40,000 | 5,000,000 |

The base wax compositions of this invention incorporating preferably at least 10% alpha olefins with a balance of petroleum waxes is then blended with selected end-product influencing additives to produce a final product with the specifically desired physical and structural properties. The primary additive which would normally be used in manufacturing candles, crayons, carbon paper, and color concentrates would be pigment or dye to obtain the desired color and density of color. At least 1% by weight of pigment is used. The terminal double bond of each unsaturated olefin molecule provides a reactive site and imparts polarity to the molecule, enhancing pigment wetting and providing improved, uniform dispersion of the pigment.

Other end-product properties which may be controlled by various additives are the strength and marking ability, both of which are particularly significant in crayon manufacturing. As will be clear to those skilled in the art, any other end-product influencing additives such as are discussed herein, may be used either individually or in combination.

The normal commercial processes for manufacturing desired products using the base wax compositions of this invention need not be altered. For exemplary purposes, crayon manufacturing will be described.

Crayon waxes

The base wax components are melted either separately or in combination, after which the pigment is incorporated and blended with suitable mixing equipment, and then the crayons are molded in the normal manner. Alternatively, the base wax components may be melted and blended, and then shipped as a molten wax product, or allowed to solidify into slabs and shipped as a solid material. At the point of final manufacturing, the crayons are then prepared by incorporating the pigment into the molten wax as received and molding, or, alternatively, the solid slabs are melted and the pigment is incorporated into the melt and then finally molded into crayons.

The alpha olefins are utilized in combination with petroleum waxes in the manufacture of crayons to provide hardness and impart a tough, rigid supporting structure which is still soft enough to carry and deposit the desired pigment as a legible mark when rubbed under pressure against the surface to be marked. They also provide the crayon with increased resistance to flaking or "balling" during use. The low melting points and low viscosities readily adapt to crayon manufacture which is normally a molding process. In addition, the unique pigment dispersing properties of the alpha olefins eliminate or substantially reduce the need for stearic acid which is normally used as a carrier for the pigments in crayons.

The conventional polyethylenes cited against the parent patent application and familiar to those in the trade, would not provide these desirable benefits in their entirety. While small amounts (preferably up to about 1.5 percent) provide increased hardness, amounts such as specified in the invention would seriously impair the marking qualities, i.e., the transfer of pigment would be lessened and pressure needed to mark the surface would be greater and cause inconvenience to the user. The high softening points and high viscosities imparted to the crayon wax compositions by the conventional polyethylenes would not readily adapt to the normal molding process because of the high temperatures needed and the poor flow characteristics which would result in crayons with poor and unsatisfactory appearances, if high viscosity did not preclude molding entirely. In addition, the conventional polyethylenes do not possess pigment dispersing properties and the requirement for stearic acid is unchanged.

Various crayon wax compositions according to this invention were prepared and tested to determine the physical qualities of the crayon product in comparison to commercially available crayon products. The results of these tests are shown in Tables V and VI.

TABLE V.—PHYSICAL TESTS OF REPRESENTATIVE COMPOSITIONS

| Composition | | Tensile strength (lbs./in.$^2$) | Elongation (inches) | Tensile energy (in. lbs./in.) |
|---|---|---|---|---|
| Composition I | 48.5% 155/65 alpha olefin<br>48.5% 133/35 paraffin<br>3.0% 165/75 microcrystalline | 308 | 0.016 | 2.5 |
| Composition I plus pigment | 48.5% 155/65 alpha olefin<br>48.5% 133/35 paraffin<br>3.0% 165/75 microcrystalline<br>3+% pigment (orange) | 276 | 0.023 | 2.3 |
| Composition II | 65.2% 155/65 alpha olefin<br>31.8% 133/35 paraffin<br>3.0% 165/75 microcrystalline | 297 | 0.016 | 2.3 |
| Composition II plus pigment | 65.2% 155/65 alpha olefin<br>31.8% 133/35 paraffin<br>3.0% 165/75 microcrystalline<br>3+% pigment (orange) | 300 | 0.017 | 2.6 |
| Typical commercial crayon product | 86.0% paraffin<br>1.0% microcrystalline<br>10+% stearic acid<br>3+% pigment | 250 | 0.014 | 1.8 |

TABLE VI.—PHYSICAL TESTS OF REPRESENTATIVE COMPOSITIONS

| Composition | | Bending strength (lbs./crayon) | Deflection (inches) | Bending energy (in. lbs./crayon) |
|---|---|---|---|---|
| Composition III (crayon) (orange) | 47.5% 155/65 alpha olefin<br>47.5% 133/35 paraffin<br>5.0% 165/75 microcrystalline | 3.5 | 0.026 | 0.048 |
| Typical commercial crayon product (orange) | 86.0% paraffin<br>1.0% microcrystalline<br>10+% stearic acid<br>3+% pigment | 2.6 | 0.040 | 0.051 |

The tensile strength tests were conducted by modification of ASTM Standard D-1320, using an Instron Tensile Tester and Modified Dow Molds. The breaking strength tests were conducted using an Instron Tensile Tester with the crayons being supported at two points 2 inches part and the force being applied to the center at a constant rate. The marking qualities were determined manually in the manner normally used for writing or marking. Observations as to intensity of color, uniformity of lay down, amount of "balling" or clumping, and amount of flaking were made. As can be readily seen from Tables IV and V, the wax crayon products using the base wax composition of this invention are equal or superior to the commercially available products.

Candle waxes

Candles are normally manufactured from petroleum waxes combined with stearic acid and various other additives to provide opacity, good appearance, burning qualities, and suitable mold release characteristics.

The alpha olefins are used in the manufacture of candles either alone or in combination with petroleum waxes to provide the structural shape and good burning qualities necessary in the finished products. In addition, they provide resistance to bending, increased hardness, impart opacity, and give excellent mold release. Normally, stearic acid, or a similar substance, is utilized to obtain these properties and, again, as in the manufacture of crayons, the requirement for stearic acid is eliminated or substantially reduced through the use of the alpha olefins.

The conventional polyethylenes do not find extensive use in the manufacture of candles. Small amounts (preferably about 0.25 percent) enhance crystal structure and provide a small degree of mold release. If used in amounts greater than that mentioned, the functional purpose of burning is destroyed. The high melting points and high viscosities of the conventional polyethylenes result in their being drawn into the wick and because of their inherent poor burning qualities, the wick is poisoned and the candle either burns poorly or the flame is snuffed out. Further, this amount does not eliminate or reduce the requirement for stearic acid.

The following Examples A and B typify successful candle base wax compositions of this invention.

|  | A | B |
|---|---|---|
| Alpha olefin, percent | 12.4 | 15.0 |
| 138/40 paraffin wax, percent | 23.8 | 23.0 |
| 122/24 paraffin wax, percent | 63.8 | 62.0 |
| Total | 100.0 | 100.0 |

The base wax compositions of this invention incorporating substantial amounts of alpha olefins exhibit desirable hardness qualities coupled with melting points significantly lower than might be expected. Melting points lower than those of any major constituent are observable, indicating that a "eutectic" type of composition results.

Color concentrates

Dustless color concentrates have been successfully prepared by adding pigment to the base wax compositions of this invention. The use of the alpha olefins in color concentrates yields a product which is uniquely compatible with many different polymers, i.e., polyethylene, polypropylene, polyolefins, polystyrene, etc., and may be defined as a universal colorant. In addition, the color concentrates have excellent pigment dispersion characteristics since the polarity of the alpha olefins allows a thorough "wetting out" of the pigment particles. The low viscosity of the alpha olefins promotes uniform blending with the polymers and provides desirable slip characteristics.

While the conventional polyethylene are used in color concentrates, the products are not universay in nature; polyethylene must be used with polyethylene, polypropylene with polypropylene, etc. This is a decided disadvantage to the manufacturer since multiple inventories must be maintained and manipulated. Further, pigment dispersion and slip charatceristics do not approach those attained with the alpha olefins.

The color concentrates of this invention provide superior coloring qualities and pigment dispersion characteristics, and also impart significant operational advantages such as excellent mold release and slip characteristics. These concentrates also exhibit desirable viscosity characteristics, promoting uniform blending with the polymers, and avoiding undesirable "bridging" of the melt entering the molds or extruders.

In place of petroleum waxes, the base wax compositions utilized in color concentrates may employ non-oxidized Fischer-Tropsch waxes such as "Paraflint RG," or oxidized Fischer-Tropsch waxes such as "Paraflint X," both sold in the United States by Moore & Munger, Inc., or combinations of these with each other or with oxidized or non-oxidized petroleum waxes. Excellent white color concentrates formulated according to this invention had the compositions listed in Examples C and D:

EXAMPLE C

| | Percent |
|---|---|
| Alpha olefin | 15 |
| "Paraflint RG" Fischer-Tropsch wax | 15 |
| $TiO_2$ pigment | 70 |

EXAMPLE D

| | |
|---|---|
| Alpha olefin | 12 |
| Non-oxidized Fischer-Tropsch wax | 10.5 |
| Oxidized Fischer-Tropsch wax | 7.5 |
| $TiO_2$ pigment | 70 |

Carbon paper base wax composition

Carbon paper coating compositions generally combine pigments with a base wax composition prepared from animal, vegetable, mineral or petroleum waxes or combinations thereof, various oils and in some instances fatty acids. Our novel base wax compositions can be used to replace the petroleum wax constituents and to partially replace the more costly natural waxes as well as the fatty acids.

Oils are incorporated in these paper coatings for supple flexibility, but bleeding of oil is prevented by the excellent oil-retention properties of our novel base wax compositions. Improved pigment dispersion and reduced smudging are produced by these novel coatings. Low shrinkage is also achieved, providing dimensional stability and avoiding curling or wrinkling of the coated paper.

In addition to pigmented coatings, these novel base wax compositions may be used in non-pigmented "backwax" coatings for carbon paper.

Alpha olefins are used extensively in carbon coatings (also referred to as carbon paper inks) in combination with other ingredients to provide compositions with good pigment dispersion and satisfactory transfer or marking qualities under pressure. Their unique pigment dispersing properties, oil retention properties and low viscosities make them ideally suitable for this use. In addition, they provide coatings with excellent dimensional stability which prevents curling or wrinkling of the coated paper.

The conventional polyethylenes find little or no use in the manufacture of carbon paper. Their high softening points, high viscosities and poor pigment dispersing properties preclude their use as coatings.

From the foregoing it will be evident that the excellent dispersibility, oil retention, hardness characteristics, and smooth, uniform and easy application or spreading qualities of these novel base wax compositions make then uniquely useful in all types of paste waxes and polishes, whether or not pigments are present.

Since the foregoing description is merely illustrative, the scope of the invention has been broadly stated herein and should be liberally interpreted so as to obtain the benefit of all equivalents to which the invention is fairly entitled.

What is claimed is:

1. A base wax composition, for mixture with selected end-product influencing additives, consisting essentially of:
   (A) at least 10% of alpha olefins having
      (a) an average molecular weight of from 350 to 900,
      (b) a minimum congealing point of 120° F. by ASTM Standard D–938,
      (c) a minimum iodine value of 30, and
      (d) a maximum Brookfield viscosity at 257° F. of 100 centipoises; and (B) a balance of waxes selected from the group consisting of petroleum paraffin waxes, petroleum intermediate waxes, petroleum microcrystalline waxes, and synthetic hydrocarbon waxes.

2. The base wax composition defined in claim 1, wherein the alpha olefins comprise a combination of at least one of the constituents selected from the group consisting of $RCH=CH_2$, $R_2C=CH_2$, $RCH=CHR$, and $R_2C=CHR$, wherein each molecule contains between 22 and 56 carbon atoms.

3. The base wax composition defined in claim 2 wherein the alpha olefins comprise a major percentage of $$RCH=CH_2$$

(normal alpha olefin).

References Cited
UNITED STATES PATENTS

| | | | |
|---|---|---|---|
| 3,048,551 | 8/1962 | Lutz | 106—270 |
| 3,300,321 | 1/1967 | Rosenberg et al. | 106—270 |
| 3,312,648 | 4/1967 | Goltman et al. | 106—270 |
| 3,491,043 | 1/1970 | Zmitrovis | 260—28.5 A |
| 3,522,198 | 7/1970 | Yamada et al. | 260—28.5 A |

MORRIS LIEBMAN, Primary Examiner

S. L. FOX, Assistant Examiner

U.S. Cl. X.R.

106—270, 19

UNITED STATES PATENT OFFICE
CERTIFICATE OF CORRECTION

Patent No. 3,772,233      Dated November 13, 1973

Inventor(s) Frederick Gaab, John W. Padgett and Sherman T. Van Esselstyn

It is certified that error appears in the above-identified patent and that said Letters Patent are hereby corrected as shown below:

Column 3, line 63, "miinmum" should read -- minimum --

Column 6, line 68, "part" should read -- apart --

Column 7, line 60, "polyethylene" should read -- polyethylenes --

Column 7, line 61, "universay" should read -- universal --

Column 7, line 66, "charatceristics" should read -- characteristics --

Signed and sealed this 2nd day of April 1974.

(SEAL)
Attest:

EDWARD M. FLETCHER, JR.
Attesting Officer

C. MARSHALL DANN
Commissioner of Patents